US008103713B2

(12) United States Patent
Khodabakchian et al.

(10) Patent No.: US 8,103,713 B2
(45) Date of Patent: Jan. 24, 2012

(54) SYSTEM AND METHOD FOR MANAGING SERVICE INTERACTIONS

(75) Inventors: Edwin Khodabakchian, Palo Alto, CA (US); Albert Chung Ming Tam, Palo Alto, CA (US); Glen Weiqun Mi, Santa Clara, CA (US); Muruganantham Chinnananchi, Mountain View, CA (US); Roman Dobrik, San Jose, CA (US)

(73) Assignee: Jade Acquisition Corporation, Redwood Shores, CA (US)

( * ) Notice: Subject to any disclaimer, the term of this patent is extended or adjusted under 35 U.S.C. 154(b) by 1625 days.

(21) Appl. No.: 10/268,856

(22) Filed: Oct. 9, 2002

(65) Prior Publication Data

US 2003/0093500 A1 May 15, 2003

Related U.S. Application Data

(60) Provisional application No. 60/328,074, filed on Oct. 9, 2001.

(51) Int. Cl.
*G06F 15/16* (2006.01)
(52) U.S. Cl. .................... 709/201; 709/202; 709/203
(58) Field of Classification Search .......... 709/201–204, 709/217–219, 230; 717/117–120
See application file for complete search history.

(56) References Cited

U.S. PATENT DOCUMENTS

| | | | |
|---|---|---|---|
| 5,778,179 A * | 7/1998 | Kanai et al. ............... 709/203 |
| 5,793,964 A | 8/1998 | Rogers et al. |
| 5,793,966 A | 8/1998 | Amstein et al. |
| 6,298,382 B1 * | 10/2001 | Doi et al. ............... 709/229 |
| 6,301,601 B1 * | 10/2001 | Helland et al. ......... 718/101 |
| 6,389,470 B1 | 5/2002 | Barr |
| 6,405,367 B1 | 6/2002 | Bryant et al. |
| 6,594,697 B1 * | 7/2003 | Praitis et al. ........... 709/225 |
| 6,711,644 B1 * | 3/2004 | Accapadi et al. ....... 710/263 |
| 6,804,818 B1 * | 10/2004 | Codella et al. .......... 719/315 |
| 6,901,425 B1 * | 5/2005 | Dykes et al. ........... 709/203 |
| 7,325,030 B2 * | 1/2008 | Wright et al. .......... 709/203 |
| 7,356,803 B2 * | 4/2008 | Bau et al. .............. 717/116 |
| 7,516,447 B2 | 4/2009 | Marvin et al. |
| 7,711,818 B2 | 5/2010 | Lee et al. |
| 7,912,895 B2 | 3/2011 | Khodabakchian et al. |
| 2001/0044821 A1 * | 11/2001 | Dunkin .................. 709/202 |
| 2002/0116205 A1 * | 8/2002 | Ankireddipally et al. ...... 705/1 |
| 2002/0188764 A1 | 12/2002 | Mortazavi et al. |
| 2005/0021594 A1 * | 1/2005 | Bernardin et al. ....... 709/200 |
| 2005/0027559 A1 | 2/2005 | Rajan et al. |
| 2008/0059964 A1 | 3/2008 | Khodabakchian et al. |

OTHER PUBLICATIONS

Application Program Interface, Free On-Line Dictionary of Computing, p. 1, Feb. 15, 1995.*
Operating System, a history and introduction, pp. 1-14, Jun. 6, 2004.*
U.S. Appl. No. 11/930,712, filed Oct. 31, 2007, Office Action mailed Jun. 2, 2010, 14 pages.

* cited by examiner

*Primary Examiner* — Joshua Joo
(74) *Attorney, Agent, or Firm* — Kilpatrick Townsend & Stockton LLP

(57) ABSTRACT

A system and method for managing service interactions launches a process that is defined by a programming abstraction based on a syntax of a general purpose programming language. Interaction with a service, such as a web-based service, is initiated and the process requests the service to perform an action. Execution of the process is suspended until a response is received from the service. Execution of the process continues after receiving a response from the service.

16 Claims, 7 Drawing Sheets

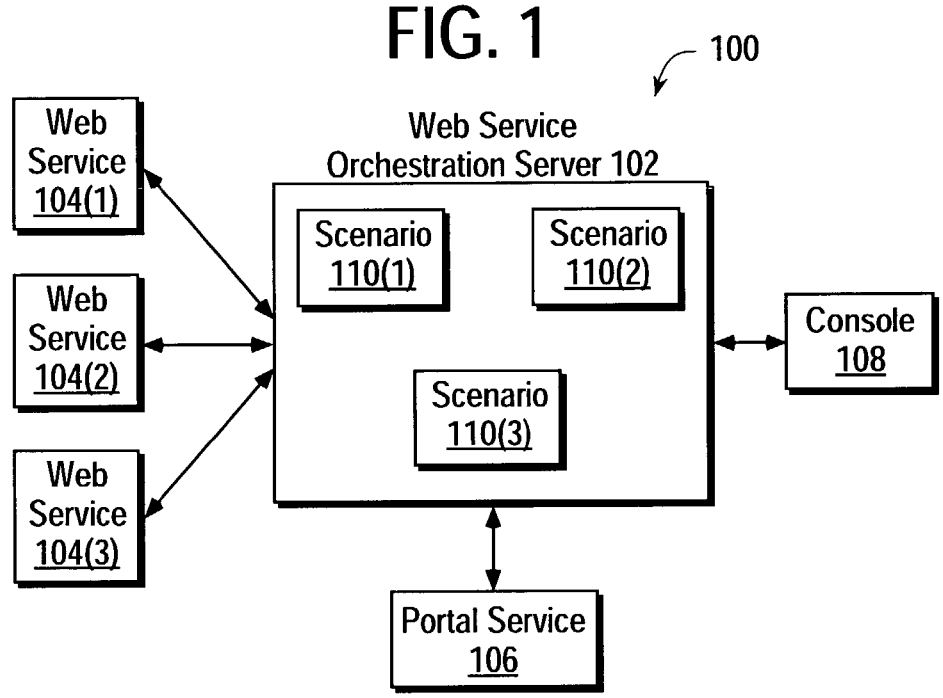
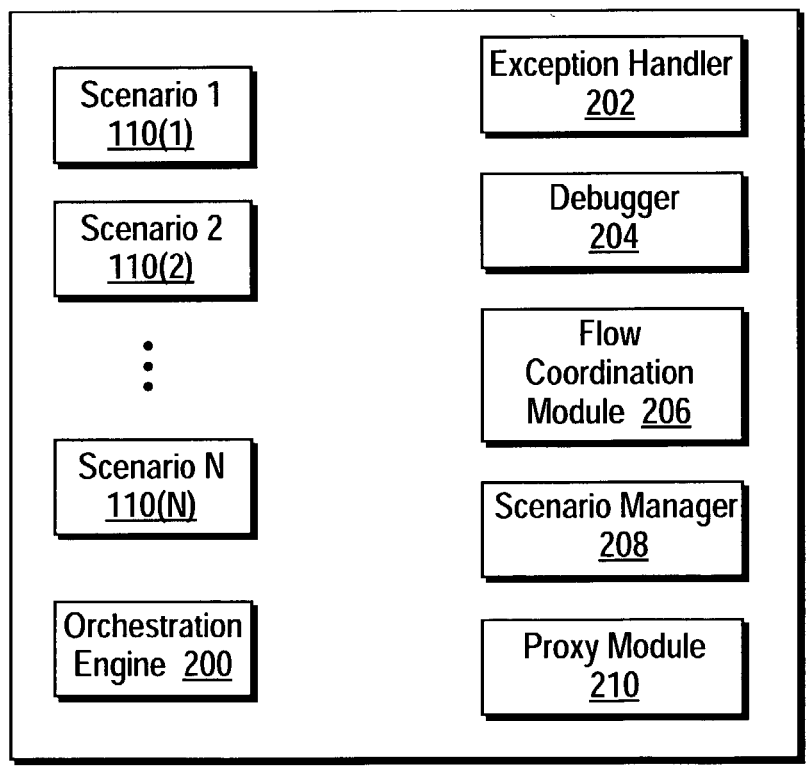

SYSTEM AND METHOD FOR MANAGING SERVICE INTERACTIONS

CROSS-REFERENCE TO RELATED APPLICATIONS

This application claims the benefit of U.S. Provisional Application Ser. No. 60/328,074, filed Oct. 9, 2001, the disclosure of which is incorporated by reference herein.

TECHNICAL FIELD

The systems and methods described herein manage interactions with one or more services, such as web-based services.

BACKGROUND

As the popularity of the Internet continues to grow, new types of Internet-based services (or web-based services) are being developed and existing Internet-based services are expanding. In an effort to automate certain procedures, many applications are communicating with other applications and/or services via the Internet to accomplish various functions. These functions may be requested, for example, by an individual user, a business entity, an application program, or another web-based service.

Many web-based services operate in an asynchronous manner (i.e., an application or individual requesting an action from the web-based service may have to wait several minutes, days, or weeks for a response). This asynchronous operation causes problems for many typical applications. Typical applications function in a manner that expects a response within a relatively short time period, such as a few seconds. These applications generally wait for the expected response before continuing their normal operation. If a response is not received within a particular period of time (such as fifteen or thirty seconds), the application may "time-out" and generate an error message or other notice indicating that the expected response was not received in a timely manner. When attempting to use this type of application with web-based services that operate in an asynchronous manner, the application is unlikely to function properly.

Accordingly, there is a need for systems and methods that are capable of handling processes that interact with one or more asynchronous services.

BRIEF DESCRIPTION OF THE DRAWINGS

The present invention is illustrated by way of example and not limitation in the figures of the accompanying drawings. The same numbers are used throughout the figures to reference like components and/or features.

FIG. 1 illustrates an exemplary environment containing various services and components, including a web service orchestration server.

FIG. 2 is a block diagram illustrating various components of an example web service orchestration server.

DETAILED DESCRIPTION

Figure 3:
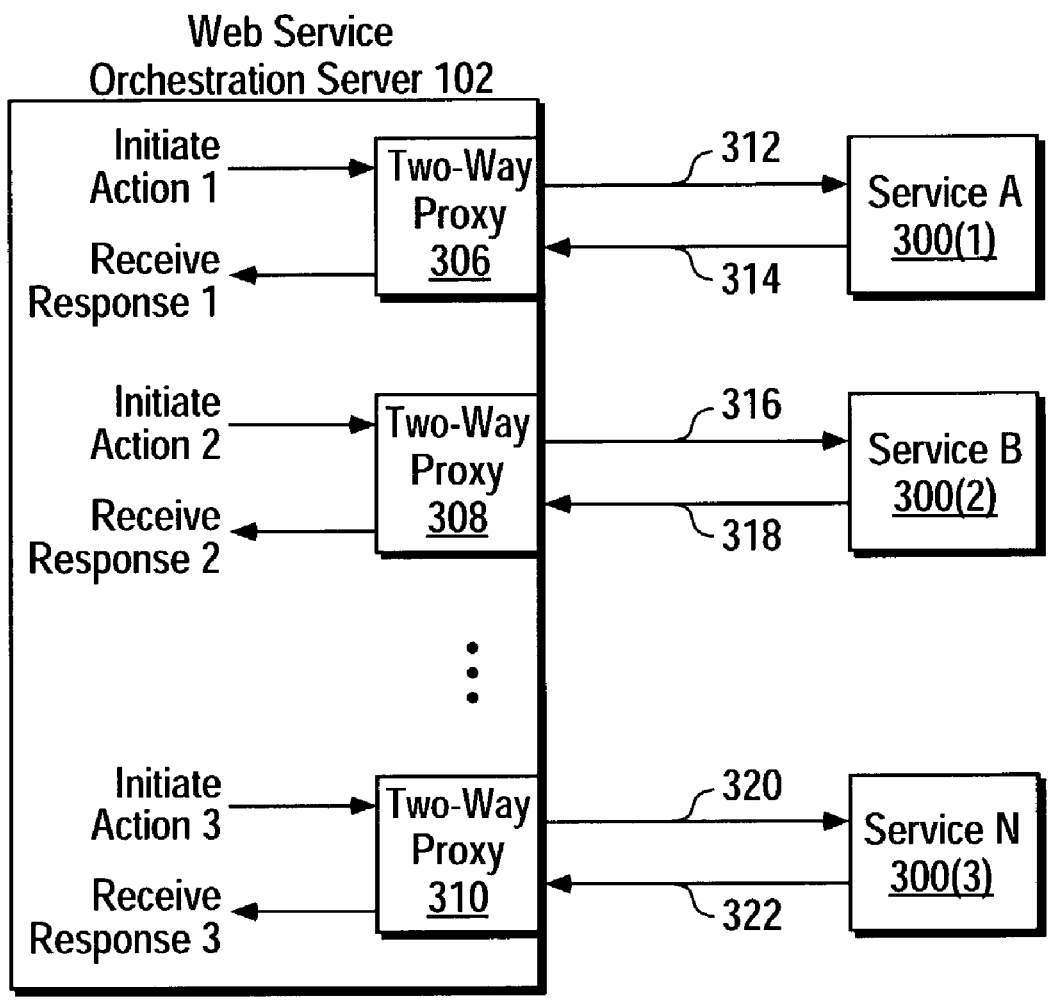
FIG. 3 illustrates an exemplary web service orchestration server coupled to multiple services, such as web-based services.

The systems and methods described herein manage execution of long-running processes in a manner that permits the long-running processes to interact with one or, more asynchronous services. These systems and methods allow developers to define the flow, interaction logic and business rules that tie a set of services into a complete end-to-end process. Additionally, the flow, interaction logic and business rules defined by developers are implemented in a manner that results in the successful completion of each long-running process or collaborative process. A typical process includes multiple interactions, such as interactions with web-based services, interactions with users and/or interactions with other applications or processes.

Particular embodiments discussed herein manage interactions with one or more web-based services (also referred to as web services or Internet-based services) via the Internet. In alternate embodiments, the systems and methods described herein may be used with any type of service, which is accessed via any type of communication mechanism. These alternate embodiments may include, for example, network-based services.

In a particular embodiment, a process that has been defined by a programming abstraction based on syntax of a general purpose programming language is launched. An interaction with a web-based service is initiated and the process requests the web-based service to perform an action. Execution of the process is suspended until a response is received from the web-based service. Execution of the process continues after a response is received from the web-based service.

Web services are implemented by first publishing details regarding the web service and then making the web service available (e.g., via the Internet) to other applications and services. Web service orchestration refers to the composition of multiple web services into a long-lived, multi-step process. In particular embodiments, web services are published as JMS (Java Messaging Service) or XML (Extensible Markup Language) web services.

As used herein, a synchronous service is a service that typically generates a response to a request in a relatively short period of time, such as a few seconds. An asynchronous service is a service that typically takes a longer period of time to generate a response. The actual response time for synchronous services and asynchronous services may vary from one moment to the next and may vary depending, for example, on the type of request and the source of the request. A particular service may change from a synchronous service to an asynchronous service (and vice versa) at any time. The response time for determining whether a service is synchronous or asynchronous can vary with the application and/or the environment in which the service is utilized.

FIG. 1 illustrates an exemplary environment 100 containing various services and components, including a web service orchestration server 102. The web service orchestration server 102 is coupled to multiple web services 104(1), 104(2) and 104(3). Web services 104 may include, for example, loan application services, credit reporting services, brokerage services, travel reservation services, market research services, and the like. Web service orchestration server 102 communicates with the various web services 104 via a data communication network, such as the Internet. Alternatively, web service orchestration server 102 may communicate with one or more web services using any type of communication link, including wireless communication links and/or wired communication links. Although three web services are shown in FIG. 1, a particular environment 100 may include any number of web services.

Web service orchestration server 102 is also coupled to one or more portal services 106 and a console 108. Portal service 106 provides a mechanism for accessing the Internet and/or other data communication networks. Web service orchestration server 102 is able to communicate with other web services via one or more portal services 106. Similarly, users can invoke processes, receive notifications, and view information via portal service 106.

Console 108 provides a user interface to the web service orchestration server 102 and allows users to control and/or monitor the activities of the web service orchestration server 102. Additionally, console 108 allows users to generate reports, load and implement processes, and perform other administrative tasks. Console 108 also allows a user to view an audit trail that provides the history of a particular scenario. A user can also use console 108 to view a transaction log, which shows a list of transactions and participants associated with each scenario and the state of the transactions and participants.

Web service orchestration server 102 contains multiple scenarios 110(1), 110(2) and 110(3). A scenario is a programming abstraction of a long-running process or a collaborative process. The programming abstraction is based on a syntax of a general purpose programming language, discussed below with reference to FIG. 4. Each scenario 110 contains a list of rules and procedures that define a particular process. The rules and procedures contained in a particular scenario 110 provide the logic that ties together interactions associated with multiple web services. For example, a particular scenario 110 may define the manner in which several different web services are utilized to process a consumer loan application. A particular web service orchestration server 102 may contain any number of scenarios 110.

A visual scenario design tool allows users (such as developers) to define and document the requirements of a particular scenario. In one embodiment, built-in wizards guide users through the process of defining different parts of a scenario. For example, the user may define partners, containers, flows, compensation rules and exception handlers for a specific scenario. The visual model can also be used when the scenario is executed for audit trailing and reporting. Once the visual model is created, the specific instructions needed to carry out the model are added to a textual representation of the scenario. This textual representation (also referred to as a "developer's view") shows the various instructions, settings, parameters, and the like that make up the scenario.

FIG. 2 is a block diagram illustrating various components of example web service orchestration server 102. As discussed above, web service orchestration server 102 may include any number of scenarios 110. Web service orchestration server 102 also includes an orchestration engine 200, which implements the various instructions and commands contained in the scenarios 110. An exception handler 202 processes exceptions that are generated by orchestration engine 200 when implementing the instructions and commands in a scenario 110. Exceptions may include, for example, a fault generated by a web service or a notice generated as a result of a web service timeout.

Web service orchestration server 102 also includes a debugger 204, which is capable of debugging various procedures and transactions, such as those defined in scenarios 110. Debugger 204 is capable of handling both synchronous transactions and asynchronous transactions. Debugger 204 associates the source code for a scenario 110 with the current state of the transaction and illustrates the current active branches, as well as points in the source code where execution is suspended (or paused). Debugger 204 also allows a user to inspect variables and documents sent to and received from one or more web services.

In a particular embodiment, debugger 204 allows a user to debug a process at all stages, including when the process has been temporarily suspended while waiting for a response from one or more services. Debugger 204 displays the various state or states of the process, including the values of variables used by the process. In this embodiment, the scenario is divided into multiple sections at logical boundaries (e.g., the boundary between interacting with different services), thereby allowing the debugger to analyze each of the multiple sections separately.

Referring again to FIG. 2, flow coordination module 206 manages the execution of a process that contains one or more interactions with services. For example, a particular process may contain interactions with two different web-based services that are executed in parallel with one another. Flow coordination module 206 manages the execution of each interaction by implementing the rules and procedures of the appropriate scenario 110 that is associated with the process initiating the interactions. In particular, flow coordination module 206 manages static and dynamic branching as well as join instructions.

A scenario manager 208 detects when an executing scenario is waiting for an asynchronous response, bookmarks the state of the scenario (or the state of the instruction that initiated the transaction) and maintains that state in a database. When the asynchronous response is received, the scenario is reactivated and its execution is resumed.

A proxy module 210 is also contained in web service orchestration server 102. The proxy module 210 is a two-way proxy that allows web service orchestration server 102 to communicate both synchronously and asynchronously with one or more services. Additional details regarding proxy module 210 are discussed below.

Other components not shown in FIG. 2 may include a delivery service and a transaction manager. The delivery service manages message exchanges between the web service orchestration server and various web services. The delivery service also manages the asynchronous notifications (also referred to as "callbacks"). The transaction manager coordinates the transaction semantics of each scenario. A scenario can be a transaction coordinator and/or a transaction participant.

FIG. 3 illustrates exemplary web service orchestration server 102 coupled to multiple services, such as web-based services. Web service orchestration server 102 generates requests to perform an action and communicates those requests to one or more of multiple services 300(1), 300(2) and 300(N). The multiple services 300 may respond to requests quickly (e.g., within a few seconds) or after a period of time (e.g., several minutes, hours, days or weeks). Web service orchestration server 102 is able to interact with different types of services, regardless of the speed at which the services respond to requests to perform an action. Web service orchestration server 102 is not required to wait for a response from a particular service before initiating another request with the same service or with a different service.

Web service orchestration server 102 includes multiple two-way proxies 306, 308 and 310. Each two-way proxy 306, 308 and 310 receives requests to perform an action and forwards each request to the appropriate service 300. Additionally, each two-way proxy 306, 308 and 310 receives responses from various services 300 and forwards each response to the orchestration engine (shown in FIG. 2) or other component in web service orchestration server 102. Each two-way proxy 306, 308 and 310 is capable of handling both synchronous transactions and asynchronous transactions. Although each two-way proxy 306, 308 and 310 is shown in FIG. 3 as being coupled to a particular service 300, in alternate embodiments, each two-way proxy 306, 308 and 310 may be coupled to any number of different services 300. Further, multiple two-way proxies 306, 308 and 310 may be coupled to the same service 300.

Two-way proxy 306 is coupled to service 300(1) via an outbound communication link 312 and an inbound communication link 314. Requests to perform a particular action (and other data) are communicated from proxy 306 to service 300(1) via outbound communication link 312. Responses (and other data) from service 300(1) are communicated to proxy 306 via inbound communication link 314. Similarly, outbound communication links 316 and 320 communicate data, such as requests to perform a particular action, from two-way proxy 308 and 310, respectively, to the appropriate service 300. Inbound communication links 318 and 322 communicate data, such as responses, from a particular service to two-way proxy 308 and 310, respectively. In a particular embodiment, data is communicated on outbound and inbound links 312-322 using XML (Extensible Markup Language). In alternate embodiments, any language and any communication protocol can be used when communicating data across links 312-322. Outbound and inbound links 312-322 may utilize any type of communication medium, including wireless and/or wired communication media.

In a particular embodiment, the two-way proxy is utilized when a process makes an asynchronous call to a routine (or asynchronously invokes an operation on an object) such that the process interacts with a web-based service. Execution of the process is suspended after calling the routine and the system passivates the state of the process. Passivation includes, for example, saving data (such as state information and variables) related to the execution of the process and releasing computing resources associated with the process. These released computing resources are then available to other processes, functions and the like. The process then waits for a response associated with the web-based service. When the response associated with the web-based service is received via the two-way proxy, the process is reactivated. Execution of the process then continues from the point at which the process was suspended using the saved data related to the execution of the process. In one embodiment, the two-way proxy is generated based on a definition of the web-based service.

FIG. 3 illustrates separate outbound communication links 312, 316 and 320 and separate inbound communication links 314, 318 and 322. However, in alternate embodiments, a single bi-directional communication link may be used to couple one or more proxies to one or more services. Although two-way proxies 306, 308 and 310 are illustrated in FIG. 3 as separate components, any number of two-way proxies can be combined in a single proxy module (such as proxy module 210 shown in FIG. 2).

Figure 4:
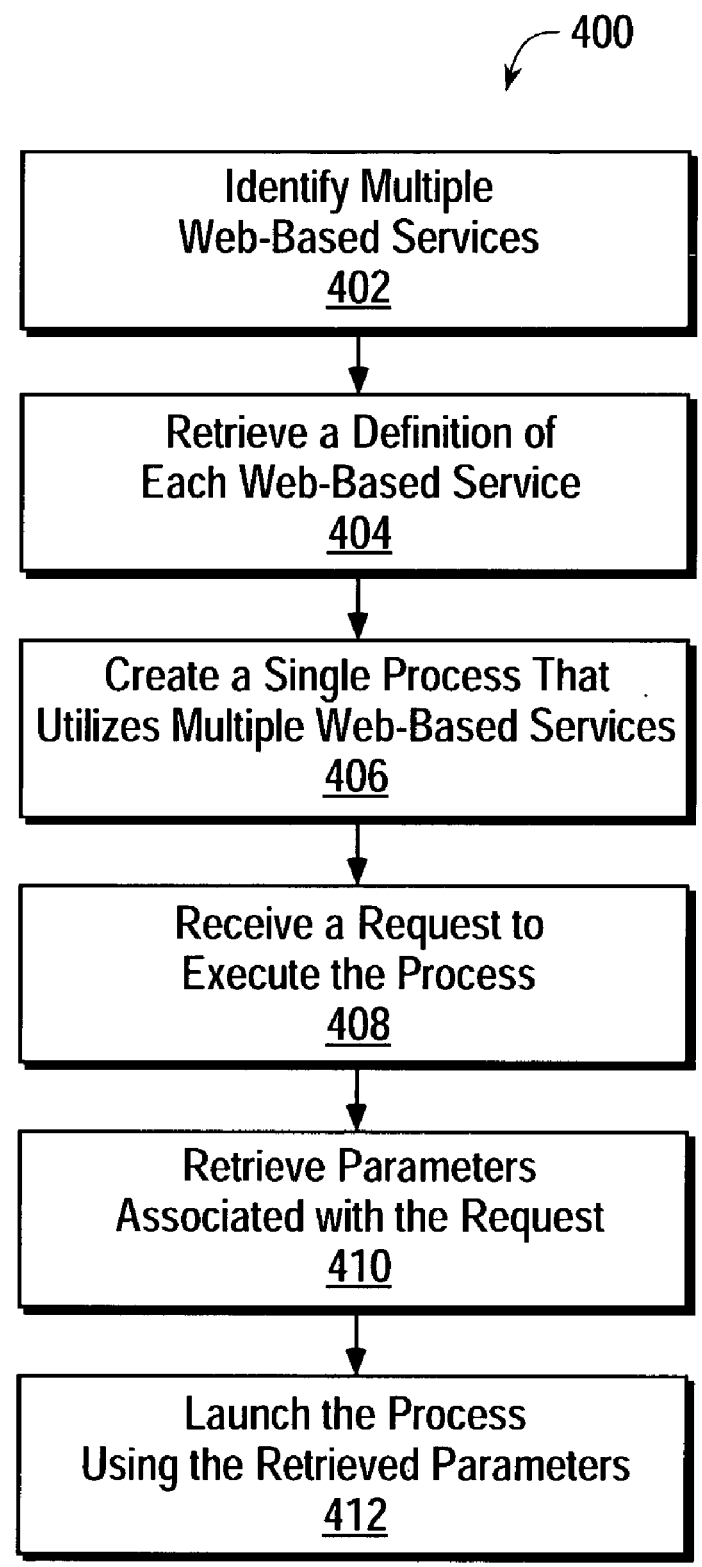
FIG. 4 is a flow diagram illustrating a procedure for generating and executing a process that utilizes multiple web-based services.

FIG. 4 is a flow diagram illustrating a procedure 400 for generating and executing a process that utilizes multiple web-based services. Initially, procedure 400 identifies multiple web-based services that are available for performing various actions (block 402). Web-based services may define their operation and service capabilities using, for example, a WSDL (Web Services Description Language) document. WSDL is an XML-formatted language used to describe a web service's capabilities as collections of communication endpoints capable of exchanging messages. The UDDI (Universal Description, Discovery and Integration) directory is a web-based distributed directory that enables service providers (and other businesses) to list themselves on the Internet. In one embodiment, SOAP (Simple Object Access Protocol) is used to transfer data between a web-based service and another device or system. SOAP is a protocol that allows applications to communicate with each other over the Internet independent of platform.

The procedure 400 continues by retrieving a definition of each web-based service previously identified (block 404). The procedure 400 then creates a single process (defined by a scenario) that utilizes one or more of the multiple web-based services (block 406). This process is defined by a programming abstraction based on a syntax of a general purpose programming language or other high-level language. Example general purpose programming languages include BASIC, C, C++, C#, JAVA, COBOL, FORTRAN, Ada and Pascal. These types of general purpose programming languages enable a programmer or developer to write programs (or develop processes) that are generally independent of a particular type of computer.

After creating a process in block 406, the procedure 400 awaits a request to execute the process. When a request to execute the process is received (block 408), the procedure retrieves (or identifies) parameters associated with the request (block 410). These parameters may indicate, for example, the types of services desired as well as data or instructions that are to be provided to the web-based services being utilized by the process. The procedure then launches the process using the retrieved parameters (block 412). Details regarding the execution of the process are provided below.

Figure 5:
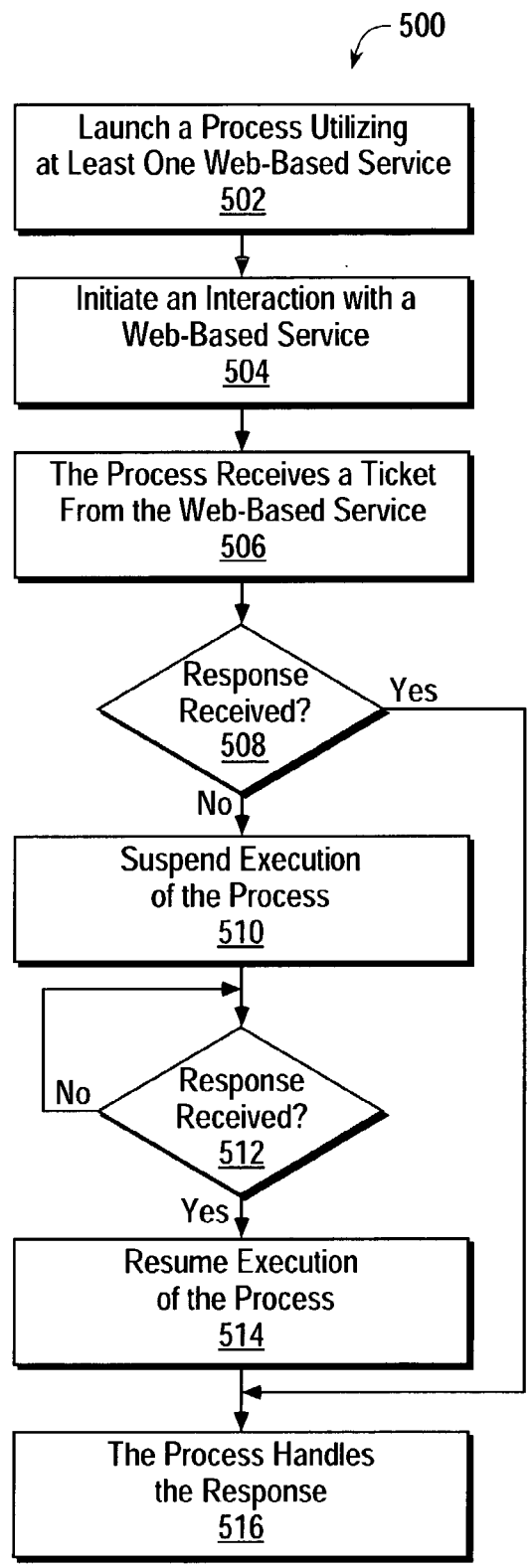
FIG. 5 is a flow diagram illustrating a procedure for executing a process that utilizes at least one web-based service.

FIG. 5 is a flow diagram illustrating a procedure 500 for executing a process that utilizes at least one web-based service. Initially, a process is launched that utilizes at least one web-based service (block 502). As the process executes, an interaction with a web-based service is initiated (block 504). As part of the interaction, the process requests the web-based service to perform an action. Initiation of the interaction includes sending the request via a two-way proxy to the appropriate web-based service. The process then receives a "ticket" from the web-based service (block 506). This ticket contains an identifier assigned to the request by the web-based service. A "ticket" may also be referred to as a "handle" or a "conversation ID".

The procedure continues by determining whether a response has been received from the web-based service to which the request was submitted (block 508). If a response has been received from the web-based service, the procedure branches to block 516, where the process handles the response. If a response has not been received from the web-based service, the procedure continues to block 510, which suspends execution of the process that was launched at block 502. In one embodiment, the procedure 500 also passivates the state of the process by storing various data associated with the process and releasing computing resources associated with the process. Execution of the process remains suspended until a response is received (block 512) from the web-based service. At that point, execution of the process resumes (block 514) by reactivating the process and continuing execution of the process from the point at which the process was suspended using the stored data associated with the process. The response received from the web-based service is then handled by the process (block 516).

The procedure discussed above with respect to FIG. 5 allows a web service orchestration server (or similar system) to interact with one or more asynchronous services by temporarily suspending execution of a process that is waiting for a response from a web-based service. The procedure of FIG. 5 may be applied to multiple processes and/or services simultaneously.

Figure 6:
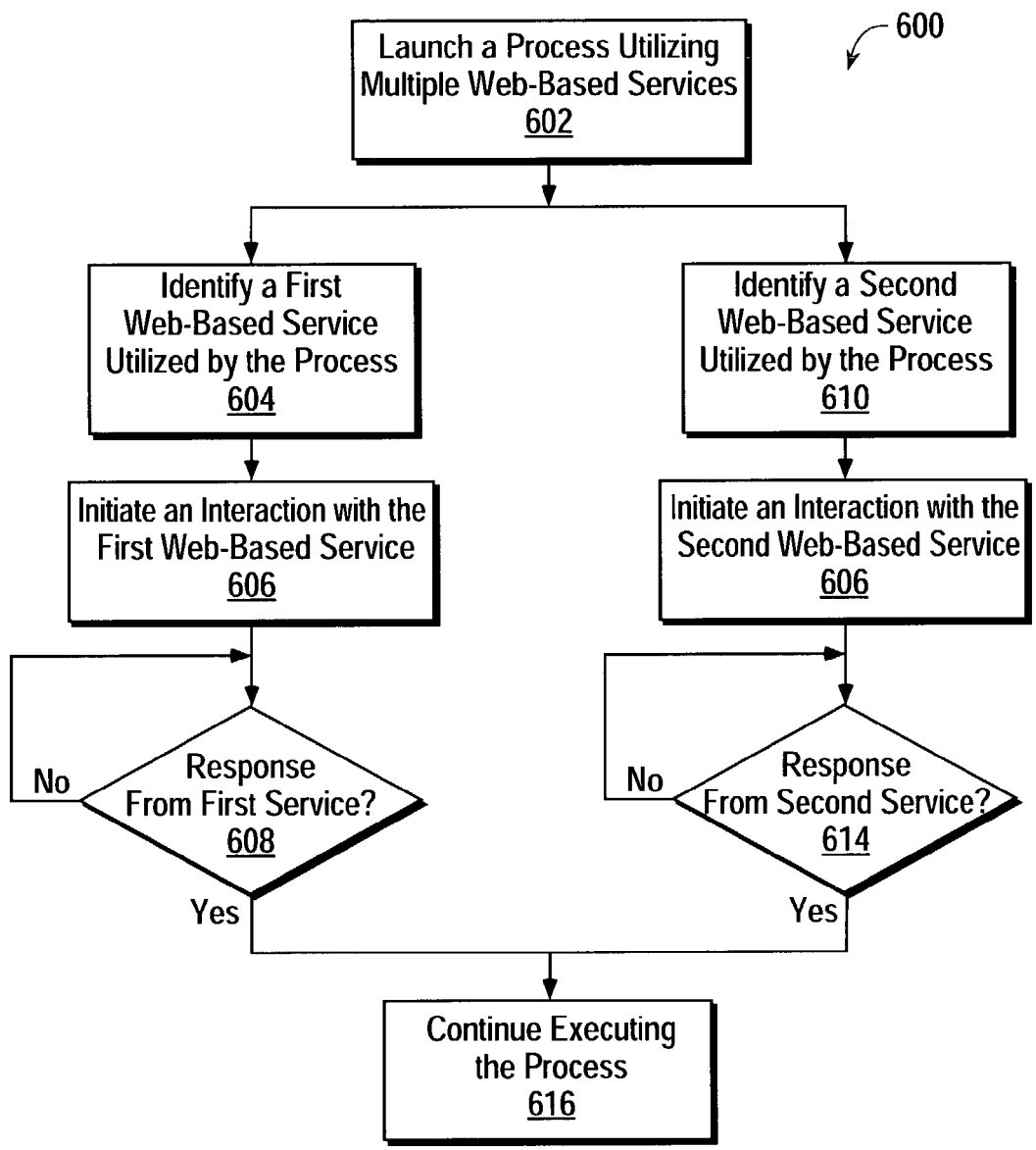
FIG. 6 is a flow diagram illustrating a procedure for executing a process that utilizes multiple web-based services.

FIG. 6 is a flow diagram illustrating a procedure 600 for executing a process that utilizes multiple web-based services. The example of FIG. 6 shows two different web-based services being utilized in parallel. In alternate embodiments, a procedure can interact with any number of different web-based services simultaneously.

Initially, the procedure launches a process utilizing multiple web-based services (block 602). The procedure branches into two separate paths that are performed in parallel with one another. Following the left branch, the procedure identifies a first web-based service utilized by the process (block 604). The procedure then initiates an interaction with the first web-based service (block 606) and awaits a response from the first web-based service (block 608).

At the same time the procedure is following the left branch, it is also following the right branch by identifying a second web-based service utilized by the process (block 610). The procedure then initiates an interaction with the second web-based service (block 612) and awaits a response from the second web-based service (block 614). The process then continues executing at block 616. After a response is received from the first or second web-based service, the s process may continue executing (block 616) at least to the extent that the process does not require a response from the other web-based service.

Figure 7:
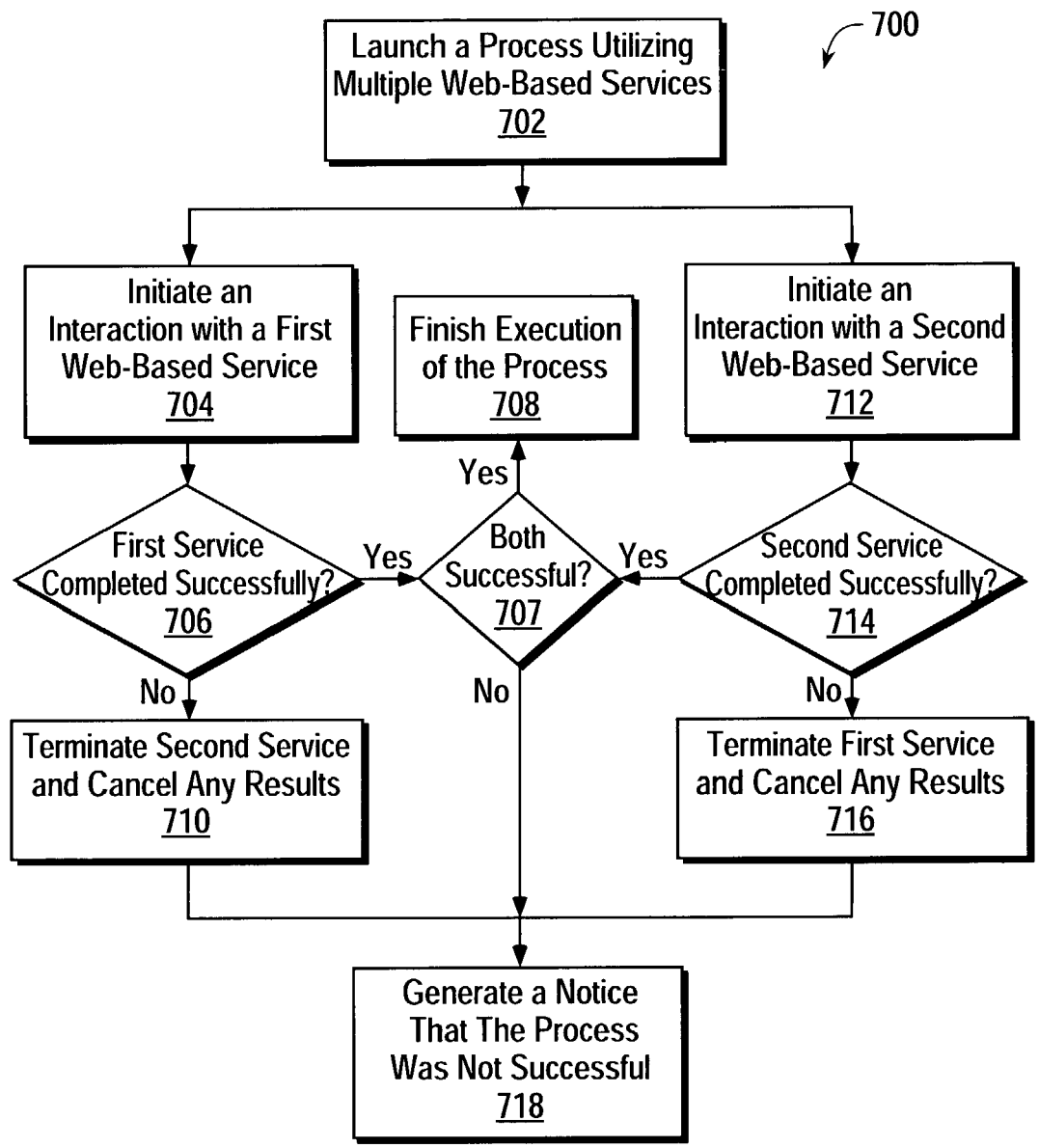
FIG. 7 is a flow diagram illustrating a procedure for executing a process that requires successful completion of at least two different web-based services.

FIG. 7 is a flow diagram illustrating a procedure 700 for executing a process that requires successful completion of at least two different web-based services. The procedure 700 is useful in situations where two or more services are related to one another, such as travel reservations. For example, when making an airline reservation and a hotel reservation for the same trip, both reservations must be completed for the process to complete successfully. If the airline reservation is not successful (e.g., flights not available or not within a required price range), the procedure should not finalize the related hotel reservation. Similarly, if the hotel reservation is not successful (e.g., no hotel rooms available for the desired date), the procedure should not finalize the related airline reservation.

Initially, the procedure 700 launches a process that utilizes multiple web-based services (block 702). The procedure branches into parallel paths. The left path initiates an interaction with a first web-based service (block 704). The procedure then determines whether the interaction with the first web-based service completed successfully (block 706). If so, the procedure branches to block 707 to determine if the other branch of the procedure also completed successfully. If the interaction with the first web-based service has not completed successfully, the left branch of the procedure terminates the interaction with the second web-based service and cancels any results generated by the second web-based service (block 710). The procedure then generates a notice that the process was not successful (block 718).

The right path of the procedure branches from block 702 to block 712 to initiate an interaction with a second web-based service. The right path of the procedure then determines whether the second web-based service completed successfully (block 714). If so, the procedure branches to block 707 to determine if the left branch of the procedure also completed successfully. If both branches completed successfully, the procedure finishes execution of the process (block 708). Otherwise, the procedure terminates the interaction with the first web-based service and cancels any results generated by the first web-based service (block 716). The procedure then generates a notice that the process was not successful (block 718).

Thus, block 708, which allows the procedure to continue executing the process is only reached if both the first web-based service and the second web-based service complete successfully. If either web-based service fails to complete successfully, the process will terminate at block 718. Although the example of FIG. 7 illustrates a process requiring successful completion of two different web-based services, alternate embodiments may require the successful completion of any number of different web-based services.

Example Scenario

As discussed above, a scenario contains a list of rules and procedures that define a particular process. The rules and procedures contained in a particular scenario provide the logic that ties together transactions associated with multiple web services. In a particular example, a scenario may define the manner in which several different web services are utilized to process a consumer loan application. In this example, a consumer loan application uses three different services: 1) a credit rating service, 2) a loan document preparation service, and 3) a loan application review service.

The following scenario illustrates a portion of an exemplary scenario that defines a loan procurement process.

public class LoanProcurement extends Scenario

```
{
    /**
     * @ws-transaction:attribute required
     * @ws-conversation:mode async
     */
    public IPolicy process (ILoanApplication loanApp)
    {
        loadGustomerProfile (loanApp);
        ...
        assignRating (loanApp);
        ...
        /** @bpel:flow */
        {
            /** @bpel:sequence AmericanLoan */
            {
                ...
                cAL = mAmericanL.initiate (loanApp);
                ...
                offer [0] = mAmericanL.receiveResult (cAL);
                ...
                waitForTask (reviewTaskId);
            }
            /** @bpel:sequence UnitedLoan */
            {
                /** @bpel-notation:activity United Loan */
                cUL = mUnitedL.initiate (loanApp);
                ...
            }
        }
        /** @bpel:join selectedProvider != null */
        {
            return enroll (selectOffer);
        }
        return null;
    }
}
```

The scenario lets developers assign transactional semantics to each operation. The resulting business processes are coordinated and managed by the web service orchestration server using transactional protocols, such as the ws-transaction and ws-coordination protocols. In the illustrated scenario, the first six lines define attributes associated with various transaction protocols.

Four different attributes can be associated with the ws-transaction protocol: required, requires-new, mandatory, and none. The "required" attribute uses the caller's transaction context, if specified, or creates a new transaction context if the caller is not part of a transaction. The "requires-new" attribute creates an independent transaction context. The "mandatory" attribute creates an exception if the caller is not providing a transaction context. The "none" attribute does not create a transaction context when interacting with web services. In a particular embodiment, multiple interactions are combined into a single transaction by annotating each of the individual interactions. The annotation allows a procedure or process to identify interactions that can or should be grouped together.

The "public IPolicy process (ILoanApplication loanApp)" instruction creates an instance of the loan application process named "loanApp". The "loadCustomerProfile (loanApp)" instruction causes the web service orchestration server to retrieve information about the customer requesting a loan. This customer information may be retrieved from the customer, from a database, or from another data source. The "assignRating (loanApp)" instruction obtains a credit rating for the customer from, for example, a credit rating service.

To coordinate the flow of the process defined in the scenario above, the "/**@bpel:flow*/" and "/**@bpel:join*/" tags are used specify that the AmericanLoan and UnitedLoan services are to be invoked in parallel. This is advantageous because both loan processing services process loan applications asynchronously. Invoking the services in parallel shortens the time that the customer waits before seeing offers from both loan processing services.

The "cAL=mAmericanL.initiate (loanApp)" instruction initiates processing of the loan application by AmericanLoan. The process invokes a two-way proxy with AmericanLoan using the "offer[0]=mAmericanL.receiveResult (cAL)" instruction. This instruction notifies the web service orchestration server that the process is waiting for a response (i.e., a loan offer) from AmericanLoan. This causes the web service orchestration server to suspend execution of that process until a response is received from AmericanLoan. Although the response might be received within a few minutes, it might take several days or weeks to receive a response.

The "waitForTask (reviewTask)" instruction indicates that the process is waiting for the customer (or loan applicant) to review each loan offer. The web service orchestration server suspends execution of the process until the task is completed. The task can be completed, for example, when the customer accepts one of the loan offers or rejects all of the loan offers.

Annotation comments, such as "/**@bpel-notation . . . */" capture information regarding the process. This information can be used to generate visual representations of scenarios, audit trails and various reports. The instruction "return enroll (selectedOffer)" enrolls the customer in the selected loan offer at the appropriate lending institution.

When a scenario is deployed (or executed), it is published as a web service and a corresponding WSDL file is created. A particular scenario can be used by other scenarios, other web services or other applications. Thus, a specific scenario may initiate processes that request multiple other scenarios to perform particular actions.

In a particular embodiment, scenarios can be initiated by a web service orchestration server in one of four ways:

1. The business delegate interface of the scenario is used by Java components such as JSPs (Java Server Pages) and Servlets.
2. The web service interface of the scenario us used by SOAP clients.
3. The JMS (Java Messaging Service) interface of a scenario can be used to initiate scenario processing based on receipt of a message to a JMS queue in a manner similar to the way Message Driven Bean work.
4. The console coupled to the web service orchestration server may be used by developers to test and debug scenarios.

In the loan processing example discussed above, when a customer submits a loan application through a portal service, a JSP is invoked which uses the business delegate interface of the LoanProcurement scenario to initiate a new instance. Since the loan procurement scenario operates asynchronously, the business delegate returns to the calling JSP a "ticket" (also referred to as a "handle") associated with the initiated transaction. This ticket can be used to obtain information on the transaction in progress, such as checking on the completion status of the transaction or canceling the transaction.

In a particular embodiment, XML documents are used to store the context of the long-lived multi-step transactions as well as to exchange information among the various orchestrated services. For example, in the loan processing situation, the submitted loan application and the collected loan offers are XML documents defined using XML Schema. Marshalling, manipulating and persisting XML documents is handled by the web service orchestration server. In one embodiment, the orchestration server provides a facility that wraps XML documents into business documents, referred to as "schemac". These business documents are Java objects whose interface reflects the structure defined by the XML schema. The business documents may include simple types, complex types, nested complex types, inherited types and arrays.

The use of scenarios simplifies the invocation and integration of both synchronous and asynchronous web services. In the loan processing example, the operations performed on the credit rating and the two loan processors are typically asynchronous. For example, it may take several days for a loan processor to generate and return an offer to the customer. Using the two-way proxy discussed above, the web service orchestration server detects the existence of an asynchronous activity, suspends execution of the process, and bookmarks the state of the process or scenario as well as the values of variables related to the execution of the process. The web service orchestration server maintains this information in a database until a response is received from the appropriate service.

The two-way proxies discussed herein are created by compiling the WSDL description of the associated web service. The resulting two-way proxy is a Java class representation of both the service and its callback (or response) interface. The generated proxy combines the signature for invoking the web service and receiving callback notification from the web service. For example, the messages received through the callback interface are accessible through the "ILoanService.receiveResult ( . . . )" call discussed above. When invoking the initiate operation, the web service orchestration server initiates a new conversation, passes the conversation ID to the invoked service as part of the SOAP header and returns it to the scenario. The conversation ID (also referred to as a ticket) is used to correlate callback messages with the appropriate request.

Exemplary Computer

Figure 8:
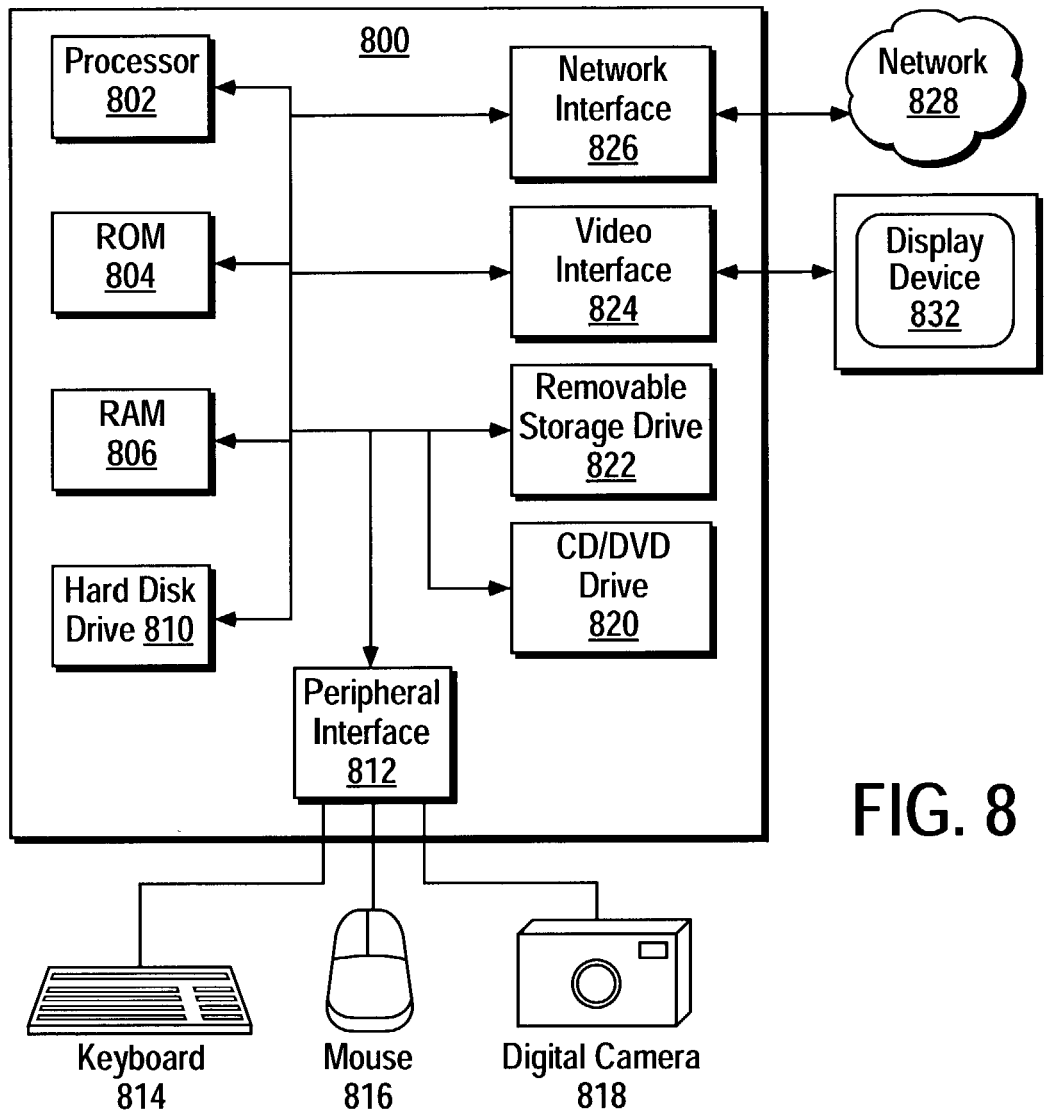
FIG. 8 illustrates various components of an exemplary computing device.

FIG. 8 shows an exemplary computing device 800 that may be used to implement, for example, a web service 104, a web service orchestration server 102, or a portal service 106. The computer system 800 can be used to perform one or more of the various procedures and processes discussed herein.

Computer 800 includes at least one processor 802 coupled to a bus 808. Bus 806 represents one or more of many different bus structures, such as a memory bus or memory controller, a peripheral bus, and a processor or local bus using any of a variety of bus architectures and protocols. Although a single bus is shown in FIG. 8, alternate embodiments may use two or more different buses for communicating data.

A Read-Only Memory (ROM) 804 and a Random Access Memory (RAM) 806 are also coupled to bus 808. A hard disk drive 810, a CD/DVD drive 820 and a removable storage drive 822 are also coupled to bus 808. Hard disk drive 810 provides for the non-volatile storage of data. CD/DVD drive 820 accommodates removable storage media (i.e., CD-ROMs and DVDs) that stores data, such as application programs. Removable storage drive 822 provides an additional storage device for various types of data. Removable storage drive 822 may be, for example, a floppy disk drive, tape drive, or other storage drive that uses optical, magnetic or other data storage technologies. Other types of storage devices (not shown) that could be utilized by computer 800 include PCMCIA cards and flash memory cards.

A variety of program modules can be stored in the memory devices 804 or 806, or in another storage device. These program modules include an operating system, a server system, one or more application programs, and other program modules and program data. In a networked environment, some or all of the program modules executed by computer 800 may be retrieved from another computing device coupled to the network.

A peripheral interface 814 is coupled to bus 808 to provide an interface for individual peripheral devices. Exemplary peripheral devices include a keyboard 814, a mouse 816 and a digital camera 818. Other peripheral devices (not shown) include a keypad, a touch pad, a trackball, a microphone, a joystick, speakers, a printer, a scanner and the like.

A video interface 824 is coupled to bus 808 and a display device 832 (e.g., a monitor, an LCD, a TV, a video projector, etc.). A network interface 826 is coupled to bus 808 and one or more data communication networks 828, such as the Internet. Network interface 826 may include, for example, a network interface card (NIC), a modem, a satellite receiver, or an RF transceiver. Data communication network 828 may be a local area network (LAN), a wide area network (WAN), or any other network capable of communicating data between nodes.

Typically, the computer 800 is programmed using instructions stored at different times in the various computer-readable media of the computer. Programs and operating systems are often distributed, for example, on floppy disks or CD-ROMs. The programs are installed from the distribution media into a storage device within the computer 800. When a program is executed, the program is at least partially loaded into the computer's primary electronic memory. These and other types of computer-readable media contain instructions or programs for implementing various processes described herein.

Memories 804 and 806, hard disk drive 810, CD/DVD drive 820 and removable storage drive 822 provide for the storage of data (e.g., computer-readable instructions, data structures, program modules and other data used by computer 800).

Computer system 800 is exemplary only—additional components may be included in system 800 and/or some components may not be included in system 800. By way of example, system 800 may include co-processors that operate in conjunction with processor 802. By way of another example, a wireless computing device may include a wireless transceiver, but not include removable storage drive 822.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:

launching a web service orchestration server having two or more scenarios, wherein each scenario includes a process defining a programming abstraction of a collaborative process, the collaborative process including interactions with each of a plurality of parallel, asynchronous services defining steps of the process, the programming abstraction based on a syntax of a general purpose programming language, wherein the process includes at least one of a rule or procedure, the rule or procedure defining a first interaction with a first web-based service of the plurality of asynchronous services for performing a first step of the process, a second interaction with a second web-based service of the plurality of asynchronous services for performing a second step of the process, and a flow of the collaborative process, and wherein the second web-based service is different from the first web-based service;

the web service orchestration server initiating the first interaction with the first web-based service based on the selected scenario of the two or more scenarios, wherein the process of the selected scenario requests the first web-based service to perform a first action defined by the scenario, wherein the first web-based service performs the first action to create a first response, and wherein initiating the first interaction comprises invoking a first two-way proxy on the web service orchestration server to establish a first communication link over a network with the first web-based service;

the web service orchestration server initiating the second interaction with the second web-based service in parallel with the first interaction based on the selected scenario, wherein the process of the selected scenario requests the second web-based service to perform a second action defined by the selected scenario, wherein the second web-based service performs the second action to create a second response, wherein the first action is dependent upon a result of the second action and the second action is dependent upon a result of the first action, and wherein initiating the second interaction comprises invoking a second two-way proxy on the web service orchestration server to establish a second communication link over the network with the second web-based service;

the invoking of the first two-way proxy or the second two-way proxy causing the web service orchestration server to suspend execution of the process of the selected scenario until the first response and the second response are received from the first web-based service and the second web-based service respectively;

the web service orchestration server determining if the first web-based service completed the first action successfully;

if the first web-based service did not complete the first action successfully, the web service orchestration server terminating the second interaction and cancelling any results from the second web-based service;

the web service orchestration server determining if the second web-based service completed the second action successfully;

if the second web-based service did not complete the second action successfully, the web service orchestration server terminating the first interaction and cancelling any results from the first web-based service;

if the first web-based service completed the first action successfully and if the second web-based service completed the second action successfully, the web service orchestration server continuing execution of the process of the selected scenario after receiving the first response and the second response from the first and second web-based services.

2. The method of claim 1, wherein the first interaction is initiated by a first instruction and the first response is identified by a second instruction.

3. The method of claim 2, wherein the process requests the first web-based service to perform the first action via the first two-way proxy and requests the second web-based service to perform the second action via the second two- way proxy.

4. The method of claim 3, wherein the first response is received from the first web-based service via the first two-way proxy and the second response is received from the second web-based service via the second two-way proxy.

5. The method of claim 1, wherein the first web-based service is an asynchronous service.

6. The method of claim 1, further comprising receiving a ticket from the first web-based service after initiating the first interaction with the first web-based service, wherein the ticket contains an identifier assigned to the request received by the first web-based service.

7. The method of claim 1, wherein suspending execution of the process includes saving data related to execution of the process.

8. The method of claim 7, wherein continuing execution of the process includes retrieving saved data related to execution of the process.

9. A system comprising:
a processor; and
a memory coupled with the processor and having stored therein a sequence of instructions which, when executed by the processor, cause the processor to manage service interactions by:
launching a web service orchestration server having two or more scenarios, wherein each scenario includes a process defining a programming abstraction of a collaborative process, the collaborative process including interactions with each of a plurality of parallel, asynchronous services defining steps of the process, the programming abstraction based on a syntax of a general purpose programming language, wherein the process includes at least one of a rule or procedure, the rule or procedure defining a first interaction with a first web-based service of the plurality of asynchronous services for performing a first step of the process, a second interaction with a second web-based service of the plurality of asynchronous services for performing a second step of the process, and a flow of the collaborative process, and wherein the second web-based service is different from the first web-based service;

the web service orchestration server initiating the first interaction with the first web-based service based on the selected scenario of the two or more scenarios, wherein the process of the selected scenario requests the first web-based service to perform a first action defined by the scenario, wherein the first web-based service performs the first action to create a first response, and wherein initiating the first interaction comprises invoking a first two-way proxy on the web service orchestration server to establish a first communication link over a network with the first web-based service;

the web service orchestration server initiating the second interaction with the second web-based service in parallel with the first interaction based on the selected scenario, wherein the process of the selected scenario requests the second web-based service to perform a second action defined by the selected scenario, wherein the second web-based service performs the second action to create a second response, wherein the first action is dependent upon a result of the second action and the second action is dependent upon a result of the first action, and wherein initiating the second interaction comprises invoking a second two-way proxy on the web service orchestration server to establish a second communication link over the network with the second web-based service;

the invoking of the first two-way proxy or the second two-way proxy causing the web service orchestration server to suspend execution of the process of the selected scenario until the first response and the second response are received from the first web-based service and the second web-based service respectively;

the web service orchestration server determining if the first web-based service completed the first action successfully;

if the first web-based service did not complete the first action successfully, the web service orchestration server terminating the second interaction and cancelling any results from the second web-based service;

the web service orchestration server determining if the second web-based service completed the second action successfully;

if the second web-based service did not complete the second action successfully, the web service orchestration server terminating the first interaction and cancelling any results from the first web-based service;

if the first web-based service completed the first action successfully and if the second web-based service completed the second action successfully, the web service orchestration server continuing execution of the process of the selected scenario after receiving the first response and the second response from the first and second web-based services.

10. The system of claim 9, wherein the first interaction is initiated by a first instruction and the first response is identified by a second instruction.

11. The system of claim 10, wherein the process requests the first web-based service to perform the first action via the first two-way proxy and requests the second web-based service to perform the second action via the second two- way proxy.

12. The system of claim 11, wherein the first response is received from the first web-based service via the first two-way proxy and the second response is received from the second web-based service via the second two-way proxy.

13. A machine-readable memory having stored thereon a sequence of instructions which, when executed by a processor, cause the processor to manage service interactions by:

launching a web service orchestration server having two or more scenarios, wherein each scenario includes a process defining a programming abstraction of a collaborative process, the collaborative process including interactions with each of a plurality of parallel, asynchronous services defining steps of the process, the programming abstraction based on a syntax of a general purpose programming language, wherein the process includes at least one of a rule or procedure, the rule or procedure defining a first interaction with a first web-based service of the plurality of asynchronous services for performing a first step of the process, a second interaction with a second web-based service of the plurality of asynchronous services for performing a second step of the process, and a flow of the collaborative process, and wherein the second web-based service is different from the first web-based service;

the web service orchestration server initiating the first interaction with the first web-based service based on the selected scenario of the two or more scenarios, wherein the process of the selected scenario requests the first web-based service to perform a first action defined by the scenario, wherein the first web-based service performs the first action to create a first response, and wherein initiating the first interaction comprises invoking a first two-way proxy on the web service orchestration server to establish a first communication link over a network with the first web-based service;

the web service orchestration server initiating the second interaction with the second web-based service in parallel with the first interaction based on the selected scenario, wherein the process of the selected scenario requests the second web-based service to perform a second action defined by the selected scenario, wherein the second web-based service performs the second action to create a second response, wherein the first action is dependent upon a result of the second action and the second action is dependent upon a result of the first action~and wherein initiating the second interaction comprises invoking a second two-way proxy on the web service orchestration server to establish a second communication link over the network with the second web-based service;

the invoking of the first two-way proxy or the second two-way proxy causing the web service orchestration server to suspend execution of the process of the selected scenario until the first response and the second response are received from the first web-based service and the second web-based service respectively;

the web service orchestration server determining if the first web-based service completed the first action successfully;

if the first web-based service did not complete the first action successfully, the web service orchestration server terminating the second interaction and cancelling any results from the second web-based service;

the web service orchestration server determining if the second web-based service completed the second action successfully;

if the second web-based service did not complete the second action successfully, the web service orchestration server terminating the first interaction and cancelling any results from the first web-based service;

if the first web-based service completed the first action successfully and if the second web-based service completed the second action successfully, the web service orchestration server continuing execution of the process of the selected scenario after receiving the first response and the second response from the first and second web-based services.

14. The machine-readable memory of claim 13, wherein the first interaction is initiated by a first instruction and the first response is identified by a second instruction.

15. The machine-readable memory of claim 14, wherein the process requests the first web-based service to perform the first action via the first two-way proxy and requests the second web-based service to perform the second action via the second two-way proxy.

16. The machine-readable memory of claim 15, wherein the first response is received from the first web-based service via the first two-way proxy and the second response is received from the second web-based service via the second two-way proxy.

* * * * *